(12) United States Patent
Huyse et al.

(10) Patent No.: US 8,612,164 B2
(45) Date of Patent: Dec. 17, 2013

(54) METHOD OF MAINTAINING A PIPELINE

(75) Inventors: Luc Huyse, Katy, TX (US); Albert Van Roodselaar, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 195 days.

(21) Appl. No.: 12/703,663

(22) Filed: Feb. 10, 2010

(65) Prior Publication Data
US 2011/0196621 A1    Aug. 11, 2011

(51) Int. Cl.
G01N 21/88    (2006.01)
G06K 9/64     (2006.01)
G01N 21/956   (2006.01)

(52) U.S. Cl.
USPC .................. 702/34; 382/209; 382/206

(58) Field of Classification Search
USPC .................... 702/34; 382/209, 206
See application file for complete search history.

(56) References Cited

U.S. PATENT DOCUMENTS

| | | | |
|---|---|---|---|
| 6,556,924 B1 | 4/2003 | Kariyawasam | |
| 6,768,959 B2 | 7/2004 | Ignagni | |
| 7,295,682 B2 * | 11/2007 | Otsuka et al. | 382/103 |
| 2002/0088281 A1 | 7/2002 | Gorman et al. | |
| 2006/0288756 A1 * | 12/2006 | De Meurechy | 73/1.01 |
| 2008/0163700 A1 | 7/2008 | Huang | |
| 2009/0229362 A1 * | 9/2009 | Tomar et al. | 73/592 |
| 2011/0196621 A1 * | 8/2011 | Huyse et al. | 702/34 |

OTHER PUBLICATIONS

Draper et al. "Applied Regression Analysis" Section "The Correlation Matrix", 1981 John Wiley and Sons, Inc., pp. 262-265.*
PCT Notification of Transmittal of the International Search Report and the Written Opinion of the International Searching Authority, or the Declaration; Aug. 4, 2011 (6 pages).
"Specifications and requirements for intelligent pig inspection of pipelines", Version 3.2, Jan. 2005. The European Pipeline Operator Forum and the ILI Asssociation.

* cited by examiner

Primary Examiner — Sujoy Kundu
Assistant Examiner — Regis Betsch
(74) Attorney, Agent, or Firm — Merchant & Gould

(57) ABSTRACT

A method of maintaining a pipeline, including estimating a corrosion rate of a pipeline segment, is provided. The method includes analyzing a first data set obtained by inspecting the pipeline segment at a first time and a second data set obtained by inspecting the pipeline segment at a second time subsequent to the first time. A plurality of matched features that include a feature in the first data set and a feature in the second data set is identified. A confidence metric for each of the matched features is calculated. A subset of the matched features is selected based on the confidence metric, a size of the matched features, and/or a desired size of the subset. The corrosion rate of the pipeline segment is calculated based on changes in a geometric characteristic of features within the subset of the matched features between the first time and the second time.

25 Claims, 4 Drawing Sheets

METHOD OF MAINTAINING A PIPELINE

BACKGROUND OF THE INVENTION

Pipelines used to transport fluids are subject to different modes of failure such as leaking or bursting. Failure of a pipeline can begin at a location that is characterized by corrosion or other defects in the wall of the pipeline. If the corrosion or other defects are known, the pipeline can be preventatively maintained. For example, the pipeline can be repaired, replaced, or otherwise serviced, or the operating conditions of the pipeline can be adjusted to reflect changes in the pipeline. In some cases, preventative maintenance of the pipeline can prevent or reduce the likelihood of failure, extend the useful life of the pipeline, and reduce costs associated with repairs and downtime. Thus, an assessment regarding the condition of a pipeline can be important in determining whether maintenance is warranted, what type of maintenance should be performed, and the timing of the maintenance.

In order to assess the risk of pipeline failure due to a leak or burst, the current state of the pipeline is typically inferred from inspections. The results of periodic inspections can also be used to estimate the rate of deterioration of the pipeline condition, such as the corrosion rate of the pipe wall, and maintenance of the pipeline can be performed according to the results. Several methods have been developed to measure corrosion rates of the pipeline.

In-line inspection (ILI) methods use an instrument that moves through the pipeline and records locations of installations such as welds, anodes, flanges, and tie-ins, as well as features such as dents, gouges, material defects, and wall losses. The ILI instrument also provides information regarding whether the feature occurs on the internal or external side of the pipewall. For example, the ILI methods measure the location in the pipe of each feature, along with the length, width, and depth of each feature, and indicate the type of feature that is being measured. For example, an ILI method may conduct magnetic flux leakage (MFL) measurements or ultrasound (UT) measurements as the instrument travels through the pipeline.

In order to monitor the pipeline integrity and estimate a corrosion rate of the pipeline, the ILI measurements are repeated at subsequent times, and measured features are matched between a first ILI run and a second ILI run. The time-averaged corrosion rate is estimated by calculating changes in geometric characteristics of the matched features. For example, changes in the depth of a feature between successive ILI runs can indicate the likelihood of a leak in the pipeline. Similarly, changes in the depth and the width or length of a feature between successive ILI runs can indicate the likelihood of a pipeline burst.

If the likelihood of a leak or burst is determined to be greater than a threshold, the pipeline can be further monitored and/or maintenance can be performed to prevent a failure. Possible maintenance operations can include replacing all or part of a pipeline, applying a sleeve or patch-like layer to the outside of the pipeline, otherwise repairing the pipeline to correct defects, adjusting the operating conditions of the pipeline, or the like.

SUMMARY OF THE INVENTION

As discussed above, MFL or UT measurements provide information about each measured feature in an ILI run, including the log-distance, clock orientation, length, width, depth, and type of the feature. However, the accuracy of the ILI measurements is known only in statistical terms, which impacts both the comparison of features in successive runs and the determination of corrosion rates.

There are many uncertainties in the measurement and feature matching processes that can result in an inaccurate estimation of the corrosion rate. The accuracy of the measured feature size is affected by an overall population bias, a per-feature bias, and a random sizing error. The overall population bias is mainly caused by the calibration of the measurement tool. The per-feature bias is mostly caused by assumptions about the aspect ratio and the shape of a feature that are used to determine the depth of the feature based on the type of the feature. Because different features may lead to the same MFL signal signature, it may not be possible to determine the size and shape of a particular feature based on the signal signature with certainty. For example, the depth tends to be more accurate for certain types of features than for other types of features. The depth of some types of features tends to be overestimated, while the depth of other types of features tends to be underestimated. The random sizing error is, among others, caused by signal and tool velocity fluctuations, interactions between neighboring features, and human interpretation errors.

The sizing accuracy also depends on the feature type. For example, general corrosion is more accurately sized than pits or grooves. Likewise the location of a feature affects the sizing accuracy. The accuracy of the measured feature size is highest for a feature in the body of the pipe, and decreases near a girth weld or a heat affected zone.

Typically a third-party specialty vendor performs an ILI measurement and provides a list of features and their characteristics. The vendor also provides an accuracy table for the tool used to perform the ILI measurement, and specifies the probability of detection (POD) for each feature type. In "Specifications and requirements for intelligent pig inspection of pipelines," Version 3.2, January 2005, the European Pipeline Operator Forum and the ILI Association have specified a format for accuracy tables that each vendor supplies for their tools. Each accuracy table includes the depth (% WT) at which 90% POD is achieved, as well as 80% and 90% confidence bounds for the depth sizing (% WT), the width sizing (mm), and the length sizing (mm) for each feature type, such as general metal loss, pitting, axial grooving, and circumferential grooving. The accuracy table provides this information for features within the body of the pipe, as well as features located near a girth weld or a heat affected zone. Because features may be undetected (POD<1) in one ILI run and reported in another ILI run, a successful feature matching algorithm should consider the POD effects.

In addition to the sizing and detection uncertainties, there are also uncertainties in the locations of the features between successive ILI runs. The location of a feature is defined by its log-distance and clock orientation as measured by the ILI instrument within the pipeline. However, the feature matching process may experience significant difficulties in establishing the locations of the features due to several issues. For example, log-distance shifts are not consistent along entire sections of the pipeline. The ILI instrument may slip as it travels down the pipeline, causing errors in the measured distance from the start of the measurement. The cumulative error in log-distances between successive ILI runs of the same pipeline can be as high as 0.1% (1 m on 1000 meter marker distance). Also, clock orientation shifts are not necessarily consistent along entire sections of the pipeline. The ILI instrument may rotate as it travels down the pipeline, in which case it becomes difficult to determine the true clock orientation of a feature. In addition, a feature may have grown between successive inspections, and this growth also affects the log-distance and clock orientation of the feature.

If none of the sizing, detection, or location uncertainties were present, matching features between successive ILI runs would simply require adjusting for any log-distance offset and any clock-orientation shift by matching the first feature that appears in each ILI run. In this case the locations of all subsequent feature pairs would automatically be adjusted, and the matching process would easily identify all feature pairs that have an identical log-distance and clock orientation. However, virtually all ILI measurements have some sizing, detection, or location uncertainties that can cause features to be matched incorrectly. When features are matched incorrectly, the accuracy of the estimate of the corrosion rate decreases. Therefore, a method of estimating the corrosion rate is needed that accounts for the uncertainties that are inherent in the feature matching process.

According to an aspect of the present invention, there is provided a method of estimating a corrosion rate of a pipeline segment by analyzing a first data set obtained by inspecting the pipeline segment at a first time and a second data set obtained by inspecting the pipeline segment at a second time subsequent to the first time. The first data set includes a plurality of first features within the pipeline segment at the first time and the second data set includes a plurality of second features within the pipeline segment at the second time. The method includes the acts of identifying a plurality of matched features within the pipeline segment, wherein each of the matched features includes one of the first features and one of the second features that correlate with each other; calculating a confidence metric for each of the matched features; selecting a subset of the matched features based on the confidence metric of each of the matched features, a size of each of the matched features, and/or a desired size of the subset of the matched features; and calculating the corrosion rate of the pipeline segment based on changes in a geometric characteristic of features within the subset of the matched features between the first time and the second time.

The identification of the matched features may include the acts of adjusting a log-distance and a clock orientation of each of the first features and/or adjusting a log-distance and a clock orientation of each of the second features; after the adjusting of the log-distances and the clock orientations, generating a correlation matrix that includes a goodness-of-fit metric for a match between each of the first features and each of the second features; and identifying each of the matched features based on the goodness-of-fit metrics within the correlation matrix.

The identification of each of the matched features may include the acts of selecting one of the first features as a candidate first matched feature; selecting one of the second features as a candidate second matched feature; identifying a first best possible match for which the candidate first matched feature has a highest goodness-of-fit metric with one of the second features; identifying a second best possible match for which the candidate second matched feature has a highest goodness-of-fit metric with one of the first features; and determining whether the candidate first matched feature and the candidate second matched feature have a highest goodness-of-fit metric within an area of the correlation matrix defined by the candidate first matched feature, the candidate second matched feature, the first best possible match, and the second best possible match. If the candidate first matched feature and the candidate second matched feature have the highest goodness-of-fit metric within the area of the correlation matrix, the candidate first matched feature and the candidate second matched feature may be identified as a best match and as a matched feature. If the candidate first matched feature and the candidate second matched feature do not have the highest goodness-of-fit metric within the area of the correlation matrix, the first feature and the second feature with the highest goodness-of-fit metric within the area of the correlation matrix may be identified as a best match and as a matched feature. The identification of each of the matched features may also include the acts of separating the correlation matrix into subsets upstream and downstream of the best match; and repeating the acts of identifying a matched feature within each of the subsets.

The adjustment of the log-distance and the clock orientation of each of the first features may include the acts of stretching, squeezing, and/or rotating the pipeline segment of the first data set such that a subset of the first features is aligned with a subset of the second features. The adjustment of the log-distance and the clock orientation of each of the second features may include the acts of stretching, squeezing, and/or rotating the pipeline segment of the second data set such that a subset of the first features is aligned with a subset of the second features. The adjustment of the log-distances and the clock orientations may be performed separately for sections of the pipeline segment along a longitudinal direction of the pipeline segment.

The goodness-of-fit metric may be based on a comparison of the log-distances of the first feature and the second feature, a comparison of the clock orientations of the first feature and the second feature, a comparison of a type of the first feature and a type of the second feature, an extent to which the first feature and the second feature overlap in axial and circumferential directions, and/or a distance from the first feature and the second feature to the nearest girth weld. A relative weight may be assigned to the comparison of the log-distances of the first feature and the second feature, the comparison of the clock orientations of the first feature and the second feature, the comparison of the type of the first feature and the type of the second feature, the extent to which the first feature and the second feature overlap in axial and circumferential directions, and/or the distance from the first feature and the second feature to the nearest girth weld.

The confidence metric for each of the matched features may be based on the goodness-of-fit metric for the matched feature, a density of features in an area surrounding the matched feature, and relative sizes of the matched feature and the features in the area surrounding the matched feature.

The calculation of the corrosion rate of the pipeline segment may include the acts of calculating a corrosion rate of each feature within the subset of the matched features based on changes in the geometric characteristic of the feature; and calculating the corrosion rate of the pipeline segment based on statistics of the corrosion rates of each feature within the subset of the matched features.

The geometric characteristic of a feature may include a length, a width, and/or a depth of the feature.

According to another aspect of the present invention, there is provided a method of estimating a corrosion rate of a pipeline segment by analyzing a first data set obtained by inspecting the pipeline segment at a first time and a second data set obtained by inspecting the pipeline segment at a second time subsequent to the first time. The first data set includes a plurality of first features within the pipeline segment at the first time and the second data set includes a plurality of second features within the pipeline segment at the second time. The method includes the acts of dividing the first data set into a plurality of first spools that are separated by first girth welds; dividing the second data set into a plurality of second spools that are separated by second girth welds; identifying a plurality of matched spools within the pipeline segment, wherein each of the matched spools includes one of the first spools and one of the second spools that correlate with each other; identifying a plurality of matched features within one of the matched spools, wherein each of the matched features includes one of the first features and one of the second features that correlate with each other; calculating a confidence metric for each of the matched features; selecting a subset of the matched features based on the confidence metric of each of the matched features, a size of each of the matched features, and/or a desired size of the subset of the matched features; and calculating the corrosion rate of the matched spool based on changes in a geometric characteristic of features within the subset of the matched features between the first time and the second time.

The identification of the matched features may include the acts of adjusting a log-distance and a clock orientation of each of the first features and/or adjusting a log-distance and a clock orientation of each of the second features; after the adjusting of the log-distances and the clock orientations, generating a correlation matrix that includes a goodness-of-fit metric for a match between each of the first features and each of the second features; and identifying each of the matched features based on the goodness-of-fit metrics within the correlation matrix.

The identification of each of the matched features may include the acts of selecting one of the first features as a candidate first matched feature; selecting one of the second features as a candidate second matched feature; identifying a first best possible match for which the candidate first matched feature has a highest goodness-of-fit metric with one of the second features; identifying a second best possible match for which the candidate second matched feature has a highest goodness-of-fit metric with one of the first features; and determining whether the candidate first matched feature and the candidate second matched feature have a highest goodness-of-fit metric within an area of the correlation matrix defined by the candidate first matched feature, the candidate second matched feature, the first best possible match, and the second best possible match. If the candidate first matched feature and the candidate second matched feature have the highest goodness-of-fit metric within the area of the correlation matrix, the candidate first matched feature and the candidate second matched feature are identified as a best match and as a matched feature. If the candidate first matched feature and the candidate second matched feature do not have the highest goodness-of-fit metric within the area of the correlation matrix, the first feature and the second feature with the highest goodness-of-fit metric within the area of the correlation matrix are identified as a best match and as a matched feature. The identification of each of the matched features may also include the acts of separating the correlation matrix into subsets upstream and downstream of the best match; and repeating the acts of identifying a matched feature within each of the subsets.

The adjustment of the log-distance and the clock orientation of each of the first features may include the acts of stretching, squeezing, and/or rotating the first spool such that a subset of the first features is aligned with a subset of the second features. The adjustment of the log-distance and the clock orientation of each of the second features may include the acts of stretching, squeezing, and/or rotating the second spool such that a subset of the first features is aligned with a subset of the second features. The adjustment of the log-distances and the clock orientations may be performed separately for sections of the matched spool along a longitudinal direction of the matched spool.

The goodness-of-fit metric may be based on a comparison of the log-distances of the first feature and the second feature, a comparison of the clock orientations of the first feature and the second feature, a comparison of a type of the first feature and a type of the second feature, an extent to which the first feature and the second feature overlap in axial and circumferential directions, and/or a distance from the first feature and the second feature to the nearest girth weld. A relative weight may be assigned to the comparison of the log-distances of the first feature and the second feature, the comparison of the clock orientations of the first feature and the second feature, the comparison of the type of the first feature and the type of the second feature, the extent to which the first feature and the second feature overlap in axial and circumferential directions, and/or the distance from the first feature and the second feature to the nearest girth weld.

The confidence metric for each of the matched features may be based on the goodness-of-fit metric for the matched feature, a density of features in an area surrounding the matched feature, and relative sizes of the matched feature and the features in the area surrounding the matched feature.

The calculation of the corrosion rate of the matched spool may include the acts of calculating a corrosion rate of each feature within the subset of the matched features based on changes in the geometric characteristic of the feature; and calculating the corrosion rate of the matched spool based on statistics of the corrosion rates of each feature within the subset of the matched features.

The geometric characteristic of a feature may include a length, a width, and/or a depth of the feature.

The assessment of the condition of the pipeline, including the estimation of the corrosion rate, can be used as a basis for determining if and when additional efforts are taken to assess or ensure the future operation of the pipeline. For example, the corrosion rate can be used to determine what type of maintenance should be performed on the pipeline, where on the pipeline the maintenance should be performed, when the maintenance should be conducted, the allowable operating conditions of the pipeline, and the like.

Other objects, advantages, and novel features of the present invention will become apparent from the following detailed description of the invention when considered in conjunction with the accompanying drawings.

DETAILED DESCRIPTION OF EXEMPLARY EMBODIMENTS

Exemplary embodiments of the present invention provide a method of estimating a corrosion rate of a pipeline segment by analyzing data sets from successive ILI runs. The first data set ILI 1 includes a plurality of first features within the pipeline segment that are measured at a first time. The second data set ILI 2 includes a plurality of first features within the pipeline segment that are measured at a second time subsequent to the first time. Each data set ILI 1 and ILI 2 includes the log-distance, clock orientation, length, width, depth, and type of each measured feature. Some examples of types of features include general metal loss, pitting, axial and circumferential slotting, and axial and circumferential grooving. Each data set ILI 1 and ILI 2 may also include the distance of each measured feature from the nearest girth weld, the shape factor or average depth of each measured feature, and the locations of other installations, such as anodes and valves. An accuracy table that indicates the sizing uncertainties for feature types in different areas of the pipeline segment may also be available. The accuracy table may be provided by the ILI service vendor, or may be derived by the operator or contractor on the basis of a comparison between ILI measurements and "in-the-ditch" or excavation results.

Figure 1:
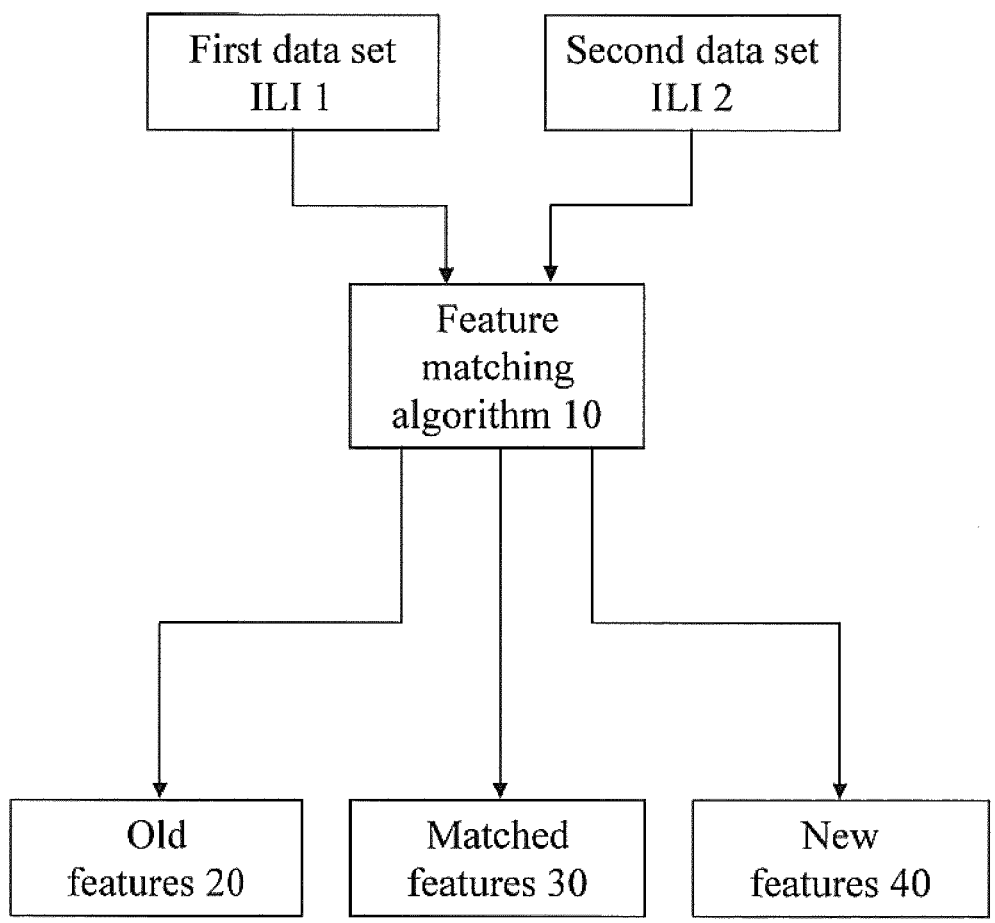
FIG. 1 shows a schematic overview of the feature matching method according to exemplary embodiments of the present invention.

In order to estimate the corrosion rate of the pipeline segment, measured features within the first ILI run are matched with measured features within the second ILI run. FIG. 1 shows a schematic overview of the feature matching method according to exemplary embodiments of the present invention. As shown in FIG. 1, the first data set ILI 1 from the first ILI run and the second data set ILI 2 from the second ILI run are input into the feature matching algorithm 10. Each feature obtained by the feature matching algorithm 10 is classified as an old feature 20, a matched feature 30, or a new feature 40. Each matched feature 30 consists of a measured feature that is present in both the first and second ILI runs, and whose readings appear to represent the same physical feature in each ILI run. Each old feature 20 is a feature that appears in the first ILI run but not in the second ILI run. The old feature 20 may not have been detected during the second ILI run, may have fallen below the reporting threshold value during the second ILI run, or may have been repaired before the second ILI run. Each new feature 40 is a feature that appears in the second ILI run but not in the first ILI run. The new feature 40 may not have been detected during the first ILI run, may have fallen below the reporting threshold value during the first ILI run, or may not have existed at the time of the first ILI run.

Figure 2:
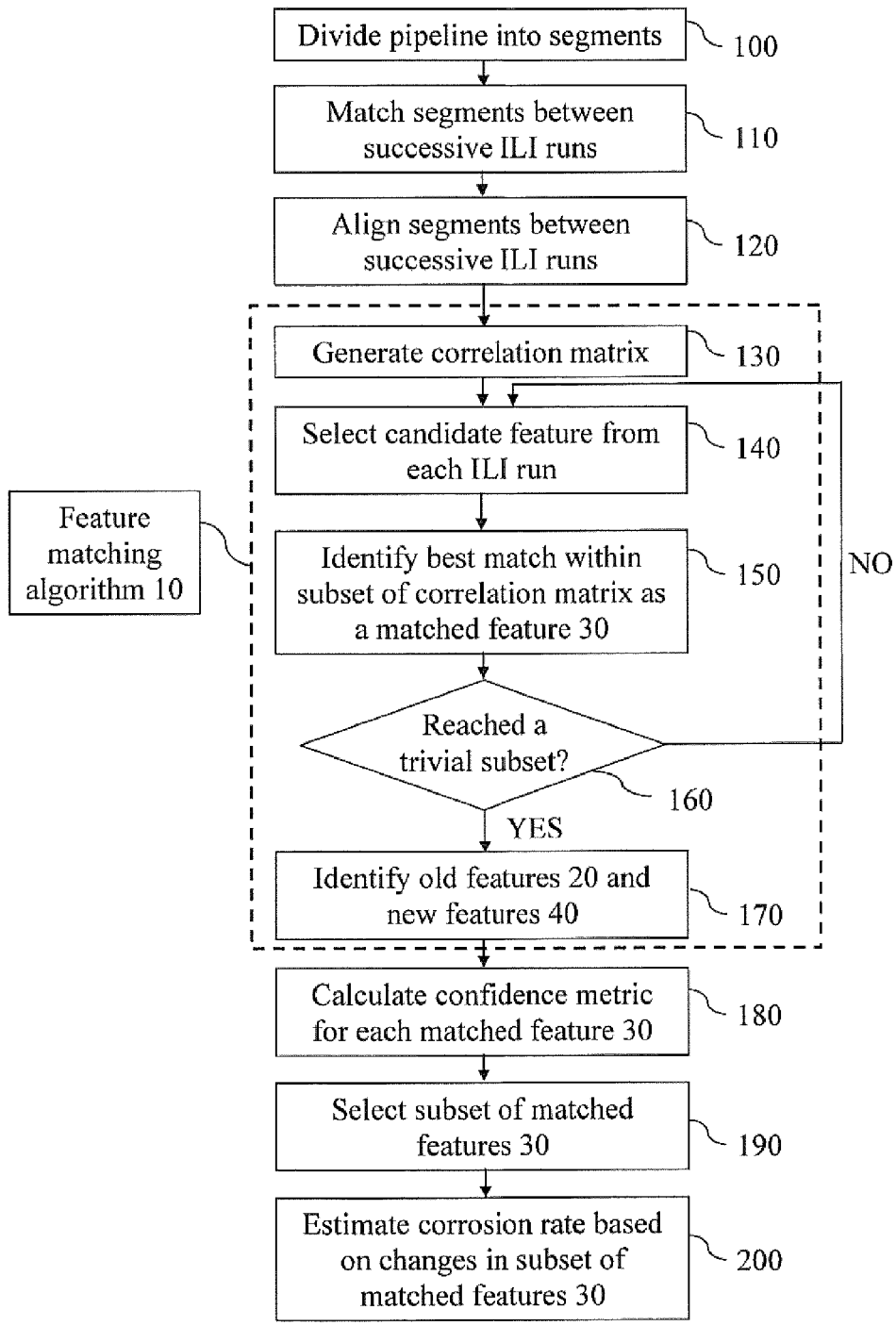
FIG. 2 shows a flowchart of a method of estimating a corrosion rate of a pipeline segment according to exemplary embodiments of the present invention.

FIG. 2 shows a flowchart of a method of estimating a corrosion rate of a pipeline segment according to exemplary embodiments of the present invention. A pipeline consists of spools that are joined by girth welds, each of which is formed around a circumference of the pipeline. A spool is typically a segment of the pipeline that has a length of 40 feet. However, the length of the spool may be less than 40 feet, usually due to a repair that has been performed. In order to assess the integrity of the pipeline according to exemplary embodiments of the invention, the pipeline may be divided into segments within which the corrosion conditions are assumed to be statistically homogeneous (step 100). A different corrosion rate may be established for each of these segments. A segment may consist of a fraction of a spool, a single spool, multiple spools, or the entire pipeline.

If the segment under consideration consists of multiple spools, a list of matched spools is identified for successive ILI runs (step 110). During each ILI run, the ILI tool detects the girth welds that separate adjacent spools. If the ILI tool detects each girth weld and none of the pipeline has been repaired, there will be a simple one-to-one correspondence between the spools measured during the first and second ILI runs. However, if the ILI tool misses a girth weld or part of the pipeline has been repaired, some of the spools measured during the second ILI run may not match the spools measured during the first ILI run. For example, if a repair sleeve is placed over a damaged section of the pipeline between the first and second ILI runs, two additional girth welds may appear at the ends of the repair sleeve in the second ILI run.

Similarly, a new section of pipeline may be inserted between the first and second ILI runs. Therefore, in order to match spools between successive ILI runs, it is necessary to account for each of the factors discussed above.

The feature matching algorithm 10 may be applied to each matched pipeline segment or to one or more matched spools within a pipeline segment. In the following exemplary embodiment, the feature matching algorithm 10 is applied to a particular matched pipeline segment, which consists of a first pipeline segment measured during the first ILI run and a second pipeline segment measured during the second ILI run. One of the pipeline segments may be stretched, squeezed, and/or rotated to match the length and the orientation of the other pipeline segment (step 120). These adjustments are determined based on the total length of each of the pipeline segments and the characteristics of features within the pipeline segments. For example, large features within low-density regions that appear in both pipeline segments may be used to align the pipeline segments. The same adjustment may be performed for the entire pipeline segment, or different adjustments may be performed for different lengthwise sections of the pipeline segment. The adjustments change the log-distance and the clock orientation of the features within the pipeline segment that is adjusted.

Figure 3A:
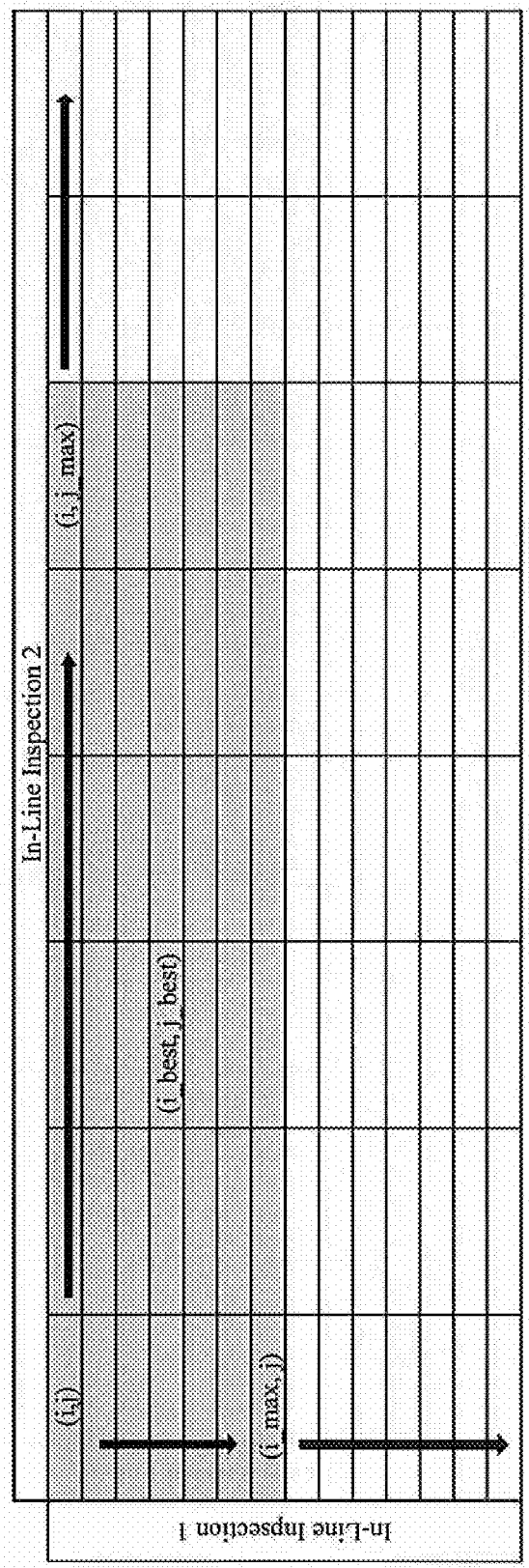
FIG. 3A shows a grid that represents a correlation matrix for two successive ILI runs.

Once the pipeline segments have been aligned, a correlation matrix is generated that consists of a goodness-of-fit metric for a potential match between each of the features within the first pipeline segment and each of the features within the second pipeline (step 130). FIG. 3A shows a grid that represents the correlation matrix for the first ILI run and the second ILI run. Each first feature measured during the first ILI run is listed on the left of the correlation matrix, and each second feature measured during the second ILI run is listed on the top of the correlation matrix. The first features measured during the first ILI run and the second features measured during the second ILI run may be sorted by log-distance from the beginning of the pipeline segment.

The goodness-of-fit metric may be calculated by comparing various sub-metrics, such as the similarity of the log-distances, clock orientations, feature types, and/or dimensions of the first feature and the second feature, while accounting for the relative uncertainties of these sub-metrics. The goodness-of-fit metric increases as the similarity of the log-distances, clock orientations, and feature types increases. The goodness-of-fit metric may also be calculated by comparing the extent to which the first feature and the second feature overlap in the axial and circumferential directions. The goodness-of-fit metric increases as the axial and circumferential overlap of the features increases.

In addition, the goodness-of-fit metric may be calculated by considering the distance of the first feature and the second feature from the nearest girth weld. Because a girth weld serves as a reference point that is easily identified in the measured ILI data, the goodness-of-fit metric increases as the distance of the first feature and the second feature from the nearest girth weld decreases. Other installations, such as valves, anodes, and flanges, may also be used as reference points. However, the term "girth weld" is consistently used to describe such a reference point in this document.

The goodness-of-fit metric calculation may also include adjustments for the relative uncertainties associated with each of the sub-metrics discussed above. For example, the comparison of the extent to which the first feature and the second feature overlap in the axial direction may relate to their length sizing accuracies, which in turn depend on the feature type. The total goodness-of-fit metric for the match between the first and second feature may be calculated by giving an appropriate weight to each sub-metric, such as the similarity of the log-distances, the similarity of the clock orientations, the distances to the nearest girth weld, the similarity of the feature types, and the axial and circumferential overlap. For example, each sub-metric may have a relative weight between 0% and 50%. The relative weight may indicate the reliability of the particular sub-metric for each first feature and second feature being evaluated.

According to an exemplary embodiment of the present invention, a recursive portion of the feature matching algorithm 10 begins by selecting a candidate feature (i) that appears in the inspection results of the first pipeline segment (step 140). A candidate feature (j) within the second pipeline segment that appears to correspond to the candidate feature (i) is also selected as a candidate second matched feature (step 140). In the following description, it is assumed that the features in both of the pipeline segments are sorted by increasing log distance. Therefore, the candidate feature (j) may be chosen such that features (i) and (j) have the same index number.

Based on the goodness-of-fit metric, a feature (j_max) within the second pipeline segment is identified as the best possible match with feature (i). The feature (j_max) has the highest value for the goodness-of-fit metric within the row indicated by the horizontal arrows in FIG. 3A. This first best possible match is labeled as (i,j_max) in FIG. 3A. Similarly, a feature (i_max) within the first pipeline segment is identified as the best possible match with feature (j). The feature (i_max) has the highest value for the goodness-of-fit metric within the column indicated by the vertical arrows in FIG. 3A. This second best possible match is labeled as (i_max,j) in FIG. 3A.

A matched feature is then identified as the best match within the shaded box of the correlation matrix shown in FIG. 3A defined by (i,j) and (i_max,j_max) (step 150). In order to identify the best match, it is first determined whether there is another pair of features within the shaded box that is a better match than the candidate matched features (i,j). The better match would have a higher value for the goodness-of-fit metric than the candidate matched features (i,j). If there is no better match within the shaded box, then the candidate matched features (i,j) are identified as the components of the best match, and as a matched feature 30. If there is a better match, then the components (i_best, j_best) are identified as the components of the best match, and as a matched feature 30.

Figure 3B:
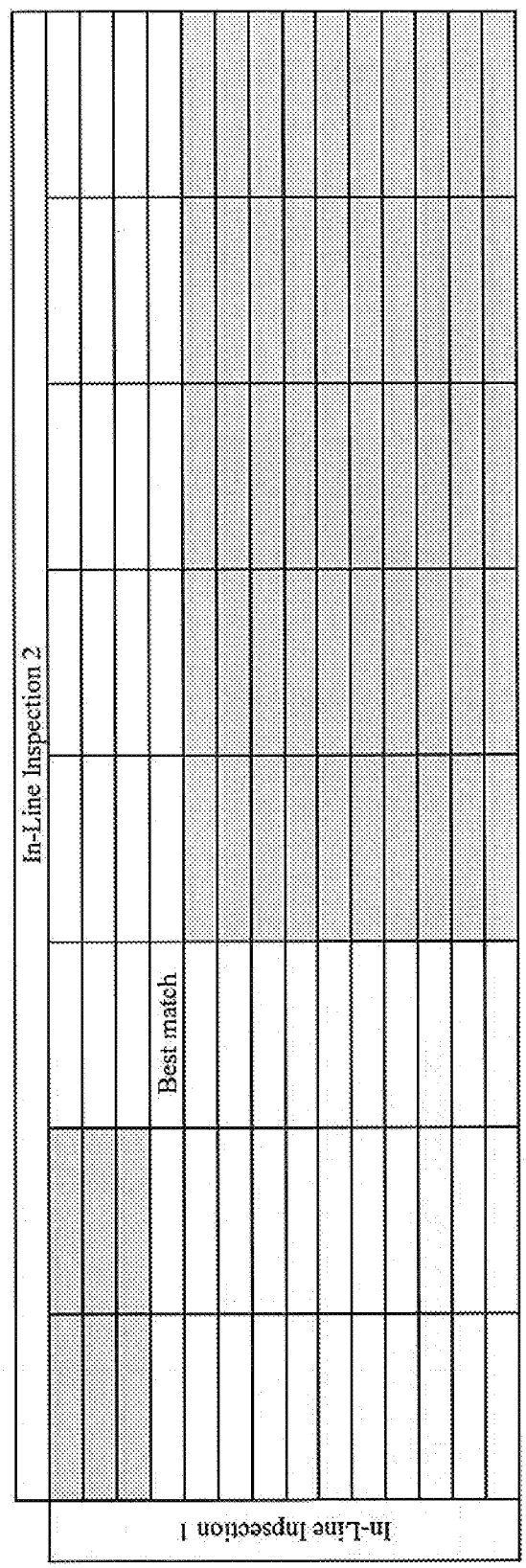
FIG. 3B shows the separation of the correlation matrix into subsets after identifying a matched feature.

If the candidate matched features (i,j) are identified as the components of a matched feature 30, the recursive portion (steps 140 and 150) of the feature matching algorithm (10) is repeated for another set of candidate matched features downstream of the candidate matched features (i,j) in FIG. 3A. On the other hand, if the features (i_best,j_best) are identified as the components of a matched feature 30, the correlation matrix shown in FIG. 3A is separated into two subsets, as shown in FIG. 3B. The first subset includes all features upstream of (i_best) and (j_best), and the second subset includes all features downstream of (i_best) and (j_best), as shown in the shaded boxes in FIG. 3B. The recursive portion (steps 140 and 150) of the feature matching algorithm (10) is then separately repeated for each of these smaller subsets, thereby identifying two additional matched features 30.

The recursive portion (steps 140 and 150) of the feature matching algorithm (10) may be repeated to continue dividing the correlation matrix into smaller subsets and identifying additional matched features 30 until only trivial subsets remain. A trivial subset has only a single feature in either the first or second pipeline segment. After identifying a matched feature 30 in step 150, the feature matching algorithm (10) determines whether a trivial subset has been reached (step 160). If a trivial subset has not been reached, the recursive portion of the feature matching algorithm (10) begins again at step 140. If a trivial subset has been reached and only a single feature remains in the first pipeline segment, such that the subset includes only a single row, the features other than the best match are identified as new features (step 170). If a trivial subset has been reached and only a single feature remains in the second pipeline segment, such that the subset includes only a single column, the features other than the best match are identified as old features 20 (step 170). Accordingly, the recursive algorithm described above may identify each of the first features and second features as a matched feature 30, an old feature 20, or a new feature 40.

As shown in FIG. 1, the feature matching algorithm 10 outputs a list of old features 20, matched features 30, and new features 40. The old features 20 and new features 40 may be evaluated to determine if there are errors in the feature matching algorithm 10. For example, if a large feature is included in the list of old features 20, an operator may inspect the data to investigate why the large feature no longer appears in the second ILI run. The operator may then intervene to adjust the feature matching algorithm 10 to correct an error. Similarly, an operator can inspect the data to determine whether a group of small old features 20 may have combined to produce a large new feature 40, and adjust the feature matching algorithm 10 accordingly.

As discussed above, there are many uncertainties inherent in the feature matching process that can result in an inaccurate estimation of the corrosion rate. Exemplary embodiments of the present invention account for these uncertainties by (1) explicitly accounting for the measurement uncertainties, and (2) using only matched features 30 for which a high degree of confidence in the accuracy of the matching itself is achieved. Therefore, many of the matched features may not be used in estimating the corrosion rate.

There are several reasons for using only critical features that are matched with a high degree of confidence to estimate the corrosion rate. First, these tend to be larger features, which pose the greatest threats to the integrity of the pipeline, and are most likely to contribute substantially to the probability of a leak or burst. Second, the matching process using only geometric information becomes much more difficult for smaller features in sections of the pipeline with a high density of features, increasing the likelihood that feature pairs will be mismatched. This adversely impacts the accuracy of the corrosion rate distribution. Mismatched features may lead to spurious, artificially high, artificially low, or negative values for the corrosion rate. Third, a sufficiently large sample of features should be used to estimate the corrosion rate. Typically more than 20 of the matched features 30 have sufficiently high degrees of confidence to be selected for the calculation of the corrosion rate. Fourth, using the growth rates for the most critical features and making the appropriate statistical corrections is a reasonable approach to hedge against the possibility of statistical dependence of the corrosion rate on the feature size. Not all features grow at the same rate, and considerable debate exists about whether deeper features grow faster or slower than smaller features.

Therefore, a confidence metric is calculated for each of the matched features 30 (step 180). The confidence metric is based on the goodness-of-fit metric for the matched feature 30, the sizes of the elements of the matched feature 30 relative to its neighbors, and the density of features in the area surrounding the matched feature 30. As discussed above, the goodness-of-fit metric may compare the log-distances, clock orientations, feature types, and/or dimensions of the first feature and the second feature. The goodness-of-fit metric may also compare the extent to which the first feature and the second feature overlap in the axial and circumferential directions. In addition, the goodness-of-fit metric may consider the distance of the first feature and the second feature from the nearest girth weld. Further, the goodness-of-fit metric may make adjustments for the relative measurement uncertainties associated with each of the sub-metrics. The effects of each of these characteristics on the goodness-of-fit metric are discussed above. Further, the confidence metric is highest when the matched feature 30 is located in a low-density area and has a size much larger than its neighbors, because in that case it is unlikely that the matched feature 30 will be confused with another nearby feature. Conversely, the confidence metric is lowest when the matched feature 30 is located in a high-density area and is very similar to its neighboring features.

Matched features 30 with a low confidence metric should not be included in the corrosion rate estimation, because incorrect matches add spurious noise to the corrosion rate distribution. In order to estimate the corrosion rate of the pipeline segment, a subset of the matched features 30 is selected (step 190). The subset of matched features 30 may be selected based on the sizes of the matched features 30, the confidence metric of the matched features 30, and/or the desired (or minimum acceptable) size of the subset. For example, the subset may include only the largest of the matched features 30, such as matched features 30 with sizes in the highest 0.1% or 10% of the feature size distribution. Further, the subset may include only matched features 30 with a confidence metric above a predetermined threshold. In addition, the subset may be adjusted to include a sufficient number of matched features 30. For example, at least 20 of the matched features 30 may be included to ensure a sufficiently large data set.

Subsequently, the corrosion rate is calculated for each feature within the subset of matched features 30 based on changes in at least one geometric characteristic of the feature between the first ILI run and the second ILI run (step 200). Some exemplary geometric characteristics include the length, the width, and the depth of the matched feature 30. As discussed above, changes in the depth of a matched feature 30 between successive ILI runs can indicate the likelihood of a leak in the pipeline. Similarly, changes in the depth and the width or length of a matched feature 30 between successive ILI runs can indicate the likelihood of a pipeline burst.

As discussed above, sizing inaccuracies may affect the calculation of the corrosion rates. The following equations can be used to filter out the effects of the sizing inaccuracies and obtain more accurate estimates of the corrosion rate statistics. The time-averaged corrosion rate CR may be estimated by:

$$CR = \frac{d(t_2) - d(t_1)}{t_2 - t_1} \quad (1)$$

In Equation (1) d represents the depth or other dimension of interest, and $t_1$ and $t_2$ represent the times of the first and second ILI runs, respectively.

An ILI run does not result in the true size of a feature. Instead, an ILI run yields a measured value that is an approximation of the true size of the feature. The measured value can be represented by:

$$m = d + e \quad (2)$$

In Equation (2) m represents the measured value, d represents the true value of the depth or other dimension, and e represents the sizing error. The time-averaged corrosion rate computed from the raw ILI data is given by:

$$CR_{raw} = \frac{m(t_2) - m(t_1)}{t_2 - t_1} = \frac{d(t_2) + e(t_2) - d(t_1) - e(t_1)}{t_2 - t_1} = CR_{true} + \frac{e(t_2) - e(t_1)}{t_2 - t_1} \quad (3)$$

Because not all features grow at the same rate, the statistics of the observed corrosion rates may be computed for the matched features 30. The expected (or average) value of the time-averaged corrosion rate $CR_{raw}$ computed from the raw ILI data is given by:

$$E[CR_{raw}] = E\left[\frac{m(t_2) - m(t_1)}{t_2 - t_1}\right] = E[CR_{true}] + E\left[\frac{e(t_2) - e(t_1)}{t_2 - t_1}\right] \quad (4)$$

Equation (4) indicates that the average corrosion rate $[CR_{raw}]$ obtained by the ILI measurements is unbiased (i.e. equal to the true average corrosion rate) as long as the sizing errors have the same average value during both inspections.

The variance of the corrosion rate distribution $CR_{raw}$, which is equal to the square of the standard deviation, is given by:

$$Var[CR_{raw}] = Var\left[\frac{m(t_2) - m(t_1)}{t_2 - t_1}\right] = \quad (5)$$

$$Var[CR_{true}] + 2Covar\left[CR_{true}, \frac{e(t_2) - e(t_1)}{t_2 - t_1}\right] + Var\left[\frac{e(t_2) - e(t_1)}{t_2 - t_1}\right]$$

The covariance of the true corrosion rate $CR_{true}$ and the difference in measurement bias during the first and second inspection is typically zero. Further, if the same inspection tool and signal interpretation algorithms are used, the variance of the first inspection equals the variance of the second inspection. Therefore, Equation (5) can be simplified as:

$$Var[CR_{raw}] = Var\left[\frac{m(t_2) - m(t_1)}{t_2 - t_1}\right] \approx \quad (6)$$

$$Var[CR_{true}] + 2Var\left[\frac{e(t_1)}{t_2 - t_1}\right] - 2Covar\left[\frac{e(t_2)}{t_2 - t_1}, \frac{e(t_1)}{t_2 - t_1}\right]$$

Alternatively, Equation (5) can be simplified as:

$$Var[CR_{true}] = Var[CR_{raw}] - 2Var\left[\frac{e(t)}{t_2 - t_1}\right] - 2Covar\left[\frac{e(t_2)}{t_2 - t_1}, \frac{e(t_1)}{t_2 - t_1}\right] \quad (7)$$

In these equations the covariance between the first ILI error and the second ILI error depends on the amount of feature specific bias, which is consistent between the first and second inspection, relative to the amount of random scatter during either inspection, which are independent of each other.

The variance equations indicate that the sizing uncertainty inflates the variability of the true corrosion rate:

$$Var[CR_{true}] \geq Var[CR_{raw}] \quad (8)$$

This is because the measurement uncertainty adds noise to the actual corrosion growth, which is translated as additional scatter into the corrosion rate statistics.

The above equations allow computation of estimates for the mean and variance of the true corrosion rate $CR_{true}$ from the raw ILI data and the ILI performance specifications provided by the vendors. However, because the ILI performance specifications have a substantial influence on the calculation of the sizing uncertainty and the corrected corrosion rate statistics, it may be preferable to use the ILI performance statistics as run, instead of as specified by the vendors. The performance statistics as run can be computed from a comparison of inert defects that are unlikely to have experienced growth, such as mill faults or from a comparison of ILI results and sizes of excavated pipeline features (only for external corrosion in onshore lines).

To obtain a full statistical description of the corrosion rate, the probability density function of the corrosion growth rate may be derived. The probability density function can most accurately be obtained from a comparison of the probability densities of the matched features 30 for the inert features and the features that likely experienced growth between the times of the two ILE runs.

Further, because the corrosion rate is estimated based on a subset of the matched features 30, the corrosion rate may be biased. This bias can be corrected by accounting for the selection criteria that were used to select the subset of the matched features 30.

According to another exemplary embodiment of the invention, there is provided a computer-readable medium encoded with a computer program with instructions for estimating the corrosion rate of a pipeline segment as described above. The term "computer-readable medium" as used herein refers to any medium that participates in providing instructions for execution. Common forms of computer-readable media include, for example, a floppy disk, a flexible disk, a hard disk, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, and any other non-transitory medium from which a computer can read.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of maintaining a pipeline, the method comprising the acts of:
   estimating a corrosion rate of a segment of the pipeline based on a first data set obtained by inspecting the pipeline segment at a first time and a second data set obtained by inspecting the pipeline segment at a second time subsequent to the first time, wherein the first data set includes a plurality of first features within the pipeline segment at the first time and the second data set includes a plurality of second features within the pipeline segment at the second time, wherein the estimating of the corrosion rate of the pipeline segment comprises executing computer-readable instructions on a computing system which, when executed, cause the computing system to perform the acts of:
   identifying a plurality of matched features within the pipeline segment, wherein each of the matched features includes one of the first features and one of the second features that correlate with each other, wherein identifying each of the matched features includes:
   selecting one of the first features as a candidate first matched feature;
   selecting one of the second features as a candidate second matched feature;
   identifying a first best possible match for which the candidate first matched feature has a highest goodness-of-fit metric with one of the second features;
   identifying a second best possible match for which the candidate second matched feature has a highest goodness-of-fit metric with one of the first features; and
   determining whether the candidate first matched feature and the candidate second matched feature have a highest goodness-of-fit metric;
   calculating a confidence metric for each of the matched features, the confidence metric based at least in part on a density of features in an area surrounding each of the matched features and relative sizes of the matched features and features in the area surrounding each of the matched features, the confidence metric comprising goodness-of-fit metrics;
   selecting a subset of the matched features based on at least one of the confidence metric of each of the matched features, a size of each of the matched features, and a desired size of the subset of the matched features; and
   calculating the corrosion rate of the pipeline segment based on a probability density of changes in a geometric characteristic of features within the subset of the matched features between the first time and the second time; and
   performing maintenance on the pipeline based on the estimated corrosion rate of the pipeline segment.

2. A method of estimating a corrosion rate of a pipeline segment based on a first data set obtained by inspecting the pipeline segment at a first time and a second data set obtained by inspecting the pipeline segment at a second time subsequent to the first time, wherein the first data set includes a plurality of first features within the pipeline segment at the first time and the second data set includes a plurality of second features within the pipeline segment at the second time, the method comprising executing computer-readable instructions on a computing system which, when executed, cause the computing system to perform the acts of:
   identifying a plurality of matched features within the pipeline segment, wherein each of the matched features includes one of the first features and one of the second features that correlate with each other wherein identifying each of the matched features includes:
   selecting one of the first features as a candidate first matched feature;
   selecting one of the second features as a candidate second matched feature;
   identifying a first best possible match for which the candidate first matched feature has a highest goodness-of-fit metric with one of the second features;
   identifying a second best possible match for which the candidate second matched feature has a highest goodness-of-fit metric with one of the first features;
   determining whether the candidate first matched feature and the candidate second matched feature have a highest goodness-of-fit metric;
   calculating a confidence metric for each of the matched features, the confidence metric based at least in part on a density of features in an area surrounding each of the matched features and relative sizes of the matched features and features in the area surrounding each of the matched features, the confidence metric comprising goodness-of-fit metrics;

selecting a subset of the matched features based on at least one of the confidence metric of each of the matched features, a size of each of the matched features, and a desired size of the subset of the matched features; and calculating the corrosion rate of the pipeline segment based on a probability density of changes in a geometric characteristic of features within the subset of the matched features between the first time and the second time.

3. The method according to claim 2, wherein the identifying of the matched features comprises the acts of:

at least one of adjusting a log-distance and a clock orientation of each of the first features and adjusting a log-distance and a clock orientation of each of the second features;

after the adjusting of the log-distances and the clock orientations, generating a table of confidence metrics that includes the goodness-of-fit metric for a match between each of the first features and each of the second features; and identifying each of the matched features based on the goodness-of-fit metrics within the correlation matrix.

4. The method according to claim 3, wherein determining whether the candidate first matched feature and the candidate second matched feature have a highest goodness-of-fit metric is based on an area of the table of confidence metrics defined by the candidate first matched feature, the candidate second matched feature, the first best possible match, and the second best possible match, wherein the identifying of each of the matched features further comprises:

if the candidate first matched feature and the candidate second matched feature have the highest goodness-of-fit metric within an area of the table of confidence metrics, identifying the candidate first matched feature and the candidate second matched feature as a best match and as a matched feature; and if the candidate first matched feature and the candidate second matched feature do not have the highest goodness-of-fit metric within the area of the table of confidence metrics, identifying the first feature and the second feature with the highest goodness-of-fit metric within the area of the table of confidence metrics as a best match and as a matched feature.

5. The method according to claim 4, wherein the identifying of each of the matched features further comprises the acts of:

separating the table of confidence metrics into subsets upstream and downstream of the best match; and repeating the acts of identifying a matched feature within each of the subsets.

6. The method according to claim 3, wherein the adjusting of the log-distance and the clock orientations comprises the acts of:

at least one of stretching, squeezing, and rotating the pipeline segment of at least one of the first and second data sets such that a subset of the first features is aligned with a subset of the second features.

7. The method according to claim 6, wherein the adjusting of the log-distance and the clock orientations comprises the acts of:

at least one of stretching, squeezing, and rotating the pipeline segment of both of the first and second data sets such that a subset of the first features is aligned with a subset of the second features.

8. The method according to claim 3, wherein the adjusting of the log-distances and the clock orientations is performed separately for sections of the pipeline segment along a longitudinal direction of the pipeline segment.

9. The method according to claim 3, wherein the goodness-of-fit metric is based on at least one of a comparison of the log-distances of the first feature and the second feature, a comparison of the clock orientations of the first feature and the second feature, a comparison of a type of the first feature and a type of the second feature, an extent to which the first feature and the second feature overlap in axial and circumferential directions, and a distance from the first feature and the second feature to the nearest girth weld.

10. The method according to claim 9, wherein a relative weight is assigned to at least one of the comparison of the log-distances of the first feature and the second feature, the comparison of the clock orientations of the first feature and the second feature, the comparison of the type of the first feature and the type of the second feature, the extent to which the first feature and the second feature overlap in axial and circumferential directions, and the distance from the first feature and the second feature to the nearest girth weld.

11. The method according to claim 3, wherein the confidence metric for each of the matched features is based at least in part on the goodness-of-fit metric for the matched feature.

12. The method according to claim 2, wherein the calculating of the corrosion rate of the pipeline segment comprises the acts of:

calculating a corrosion rate of each feature within the subset of the matched features based on changes in the geometric characteristic of the feature; and calculating the corrosion rate of the pipeline segment based on statistics of the corrosion rates of each feature within the subset of the matched features.

13. The method according to claim 2, wherein the geometric characteristic of a feature comprises at least one of a length, a width, and a depth of the feature.

14. A method of estimating a corrosion rate of a pipeline segment based on a first data set obtained by inspecting the pipeline segment at a first time and a second data set obtained by inspecting the pipeline segment at a second time subsequent to the first time, wherein the first data set includes a plurality of first features within the pipeline segment at the first time and the second data set includes a plurality of second features within the pipeline segment at the second time, the method comprising executing computer-readable instructions on a computing system which, when executed, cause the computing system to perform the acts of:

dividing the first data set into a plurality of first spools that are separated by first girth welds;

dividing the second data set into a plurality of second spools that are separated by second girth welds;

identifying a plurality of matched spools within the pipeline segment, wherein each of the matched spools includes one of the first spools and one of the second spools that correlate with each other;

identifying a plurality of matched features within one of the matched spools, wherein each of the matched features includes one of the first features and one of the second features that correlate with each other based on a goodness-of fit metric;

calculating a confidence metric for each of the matched features, the confidence metric based at least in part on a density of features in an area surrounding each of the matched features and relative sizes of the matched features and features in the area surrounding each of the matched features, the confidence metric comprising goodness-of-fit metrics;

selecting a subset of the matched features based on at least one of the confidence metric of each of the matched features, a size of each of the matched features, and a desired size of the subset of the matched features; and calculating the corrosion rate of the matched spool based on a probability density of changes in a geometric characteristic of features within the subset of the matched features between the first time and the second time.

15. The method according to claim 14, wherein the identifying of the matched features comprises the acts of:

at least one of adjusting a log-distance and a clock orientation of each of the first features and adjusting a log-distance and a clock orientation of each of the second features;

after the adjusting of the log-distances and the clock orientations, generating a table of confidence metrics that includes the goodness-of-fit metric for a match between each of the first features and each of the second features; and identifying each of the matched features based on the goodness-of-fit metrics within the table of confidence metrics.

16. The method according to claim 15, wherein the identifying of each of the matched features comprises the acts of:

selecting one of the first features as a candidate first matched feature;

selecting one of the second features as a candidate second matched feature;

identifying a first best possible match for which the candidate first matched feature has a highest goodness-of-fit metric with one of the second features;

identifying a second best possible match for which the candidate second matched feature has a highest goodness-of-fit metric with one of the first features;

determining whether the candidate first matched feature and the candidate second matched feature have a highest goodness-of-fit metric within an area of the table of confidence metrics defined by the candidate first matched feature, the candidate second matched feature, the first best possible match, and the second best possible match;

if the candidate first matched feature and the candidate second matched feature have the highest goodness-of-fit metric within the area of the table of confidence metrics, identifying the candidate first matched feature and the candidate second matched feature as a matched feature; and if the candidate first matched feature and the candidate second matched feature do not have the highest goodness-of-fit metric within the area of the table of confidence metrics, identifying the first feature and the second feature with the highest goodness-of-fit metric within the area of the table of confidence metrics as a matched feature.

17. The method according to claim 16, wherein the identifying of each of the matched features further comprises the acts of:

separating the table of confidence metrics into subsets upstream and downstream of the best match; and repeating the acts of identifying a matched feature within each of the subsets.

18. The method according to claim 15, wherein the adjusting of the log-distance and the clock orientation of each of the first features comprises the acts of:

at least one of stretching, squeezing, and rotating the first spool such that a subset of the first features is aligned with a subset of the second features.

19. The method according to claim 15, wherein the adjusting of the log-distance and the clock orientations of each of the second features comprises the acts of:

at least one of stretching, squeezing, and rotating the second spool such that a subset of the first features is aligned with a subset of the second features.

20. The method according to claim 15, wherein the adjusting of the log-distances and the clock orientations is performed separately for sections of the matched spool along a longitudinal direction of the matched spool.

21. The method according to claim 15, wherein the goodness-of-fit metric is based on at least one of a comparison of the log-distances of the first feature and the second feature, a comparison of the clock orientations of the first feature and the second feature, a comparison of a type of the first feature and a type of the second feature, an extent to which the first feature and the second feature overlap in axial and circumferential directions, and a distance from the first feature and the second feature to the nearest girth weld.

22. The method according to claim 21, wherein a relative weight is assigned to at least one of the log-distances of the first feature and the second feature, a comparison of the clock orientations of the first feature and the second feature, a comparison of a type of the first feature and a type of the second feature, an extent to which the first feature and the second feature overlap in axial and circumferential directions, and a distance from the first feature and the second feature to the nearest girth weld.

23. The method according to claim 15, wherein the confidence metric for each of the matched features is based at least in part on the goodness-of-fit metric for the matched feature.

24. The method according to claim 14, wherein the calculating of the corrosion rate of the matched spool comprises the acts of:

calculating a corrosion rate of each feature within the subset of the matched features based on changes in the geometric characteristic of the feature; and calculating the corrosion rate of the matched spool based on statistics of the corrosion rates of each feature within the subset of the matched features.

25. The method according to claim 14, wherein the geometric characteristic of a feature comprises at least one of a length, a width, and a depth of the feature.

* * * * *